United States Patent [19]

Struble

[11] Patent Number: 5,473,822
[45] Date of Patent: Dec. 12, 1995

[54] CONTINUOUS AIR FLOW PROBE TRANSDUCER GAGE ASSEMBLY

[75] Inventor: James E. Struble, Williamston, Mich.

[73] Assignee: JS Research and Development, Inc., Williamston, Mich.

[21] Appl. No.: 253,770

[22] Filed: Jun. 3, 1994

[51] Int. Cl.⁶ ............................. G01B 13/00; G01B 13/16
[52] U.S. Cl. ................ 33/559; 33/556; 33/DIG. 2
[58] Field of Search .................... 33/559, 556, 557, 33/558, 560, 561, DIG. 2

[56] References Cited

U.S. PATENT DOCUMENTS

| | | | |
|---|---|---|---|
| 2,876,553 | 3/1959 | Tomkow | 33/DIG. 2 |
| 2,898,683 | 8/1959 | Kiefaber | 33/DIG. 2 |
| 2,995,825 | 8/1961 | Sakaitis et al. | 33/560 |
| 3,750,298 | 8/1973 | Turner | 33/DIG. 2 |
| 4,221,053 | 9/1980 | Bobel, II et al. | 33/558 |
| 4,716,657 | 1/1988 | Collingwood | 33/561 |
| 4,854,156 | 8/1989 | Hoeffel et al. | 33/DIG. 2 |
| 5,136,789 | 8/1992 | Burton | 33/559 |

Primary Examiner—Christopher W. Fulton
Attorney, Agent, or Firm—MacMillan, Sobanski & Todd

[57] ABSTRACT

A continuous air flow probe transducer gage assembly which is configured to permit a continuous selectively controlled flow of air therethrough so as to selectively actuate a spring-biased air piston probe slidably mounted therein from its retracted rest position into its extended soft contact measuring position against a part being measured. The continuous air flow probe transducer assembly is adapted to be a part of a computer controlled system whereby several variable air flow modes are delivered therethrough so that selective rest position air flow modes, high volume air flow calibration modes and operative soft contact air flow measuring modes are used to actuate the probe transducer in its operative use environment.

29 Claims, 12 Drawing Sheets

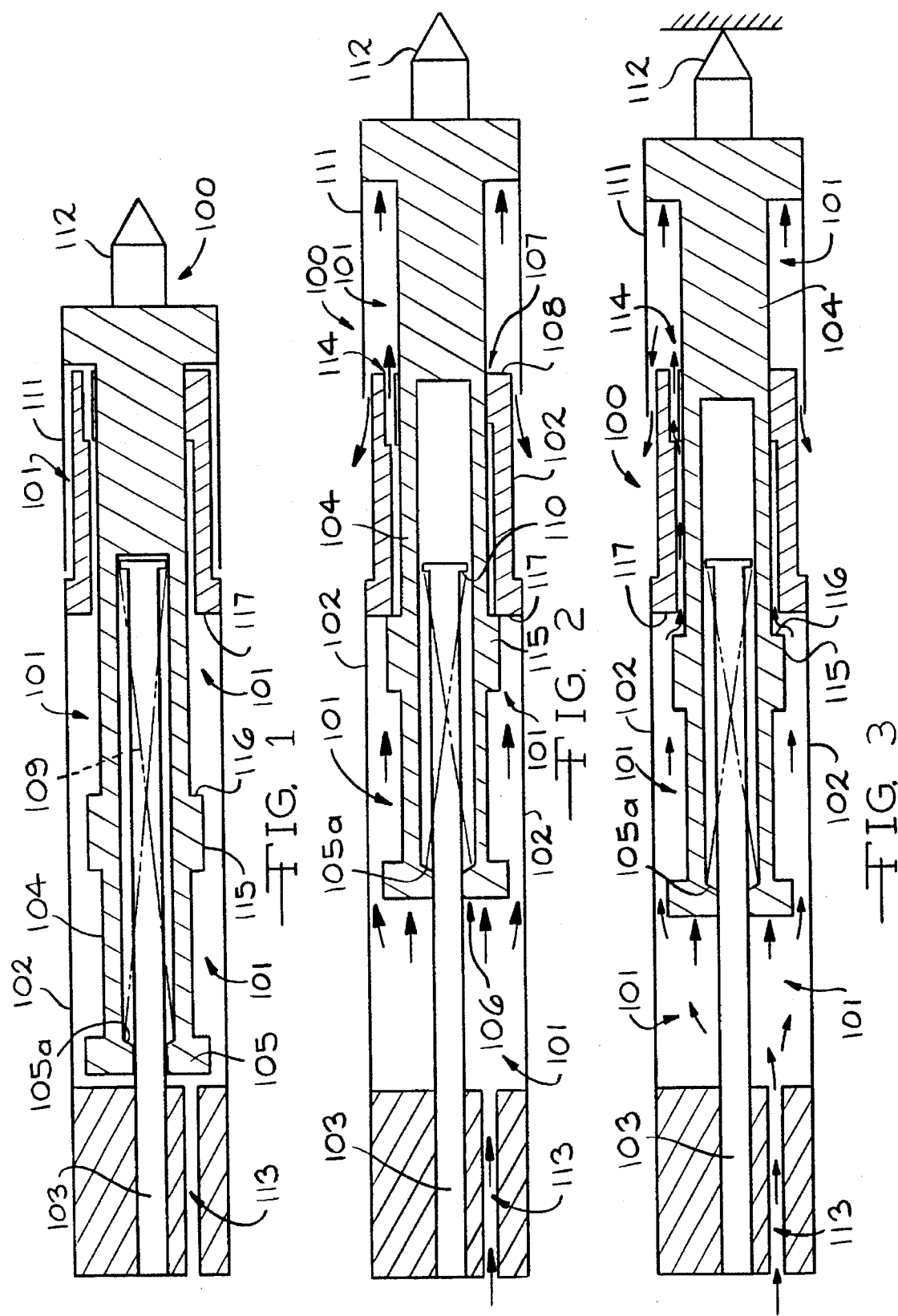

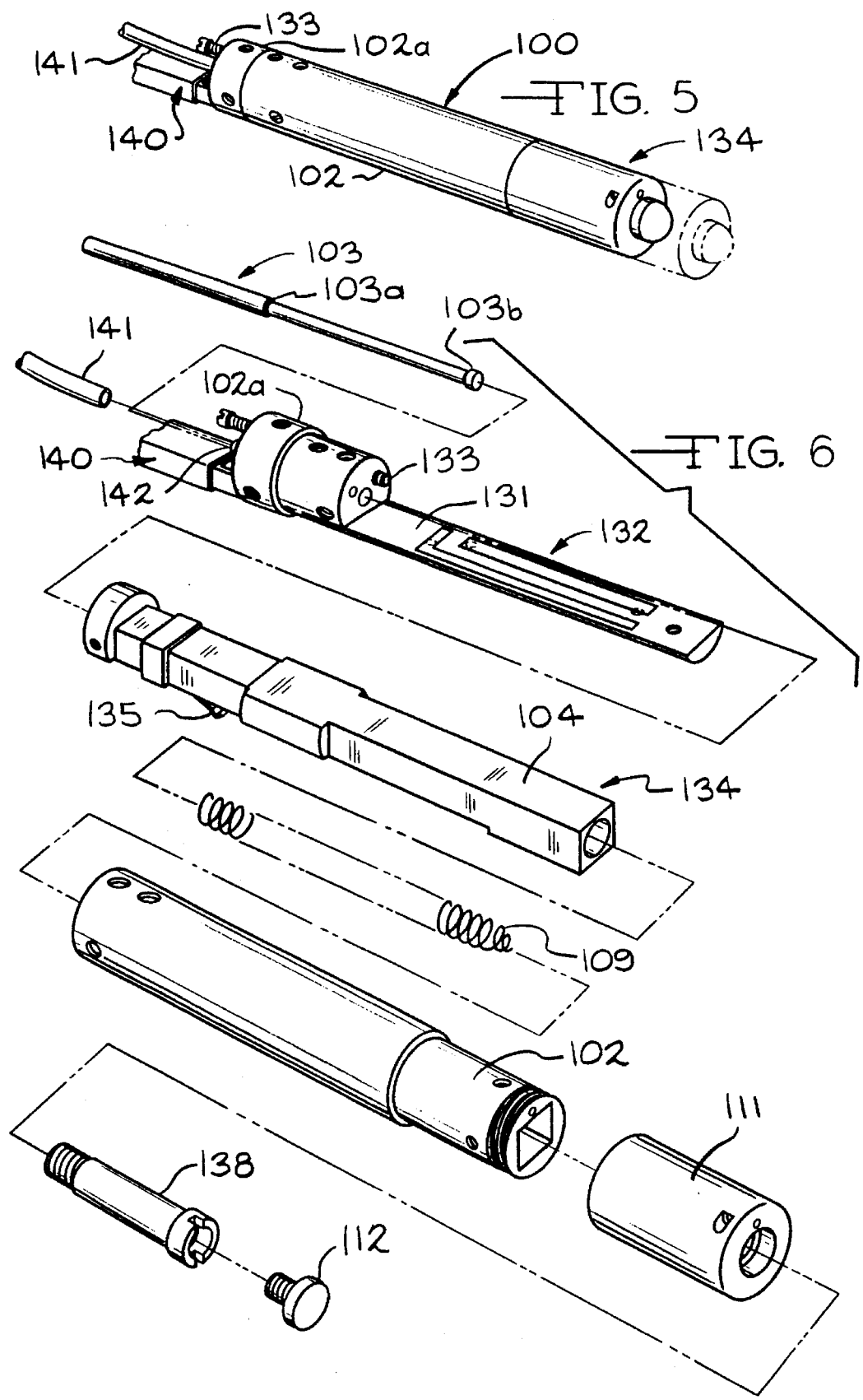

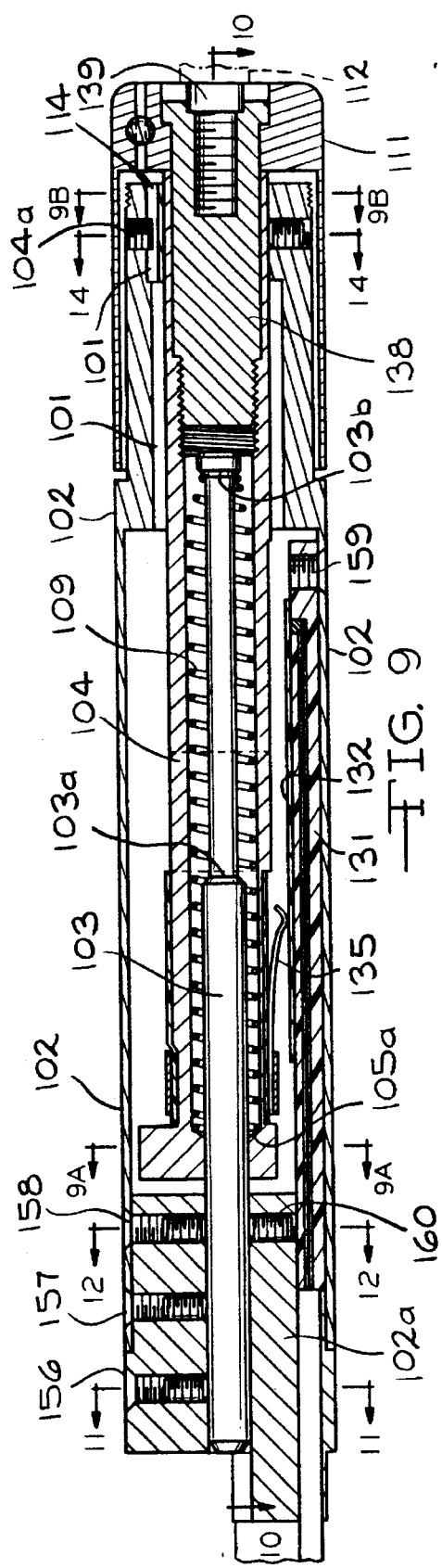
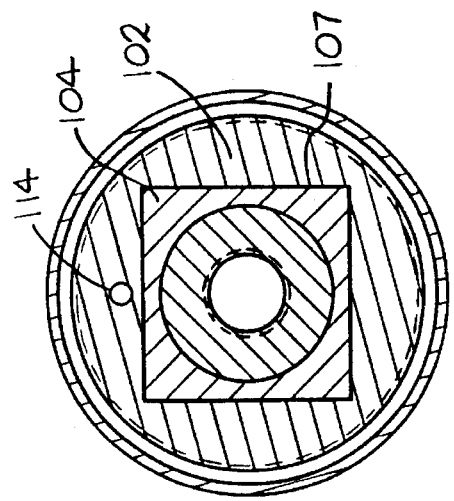
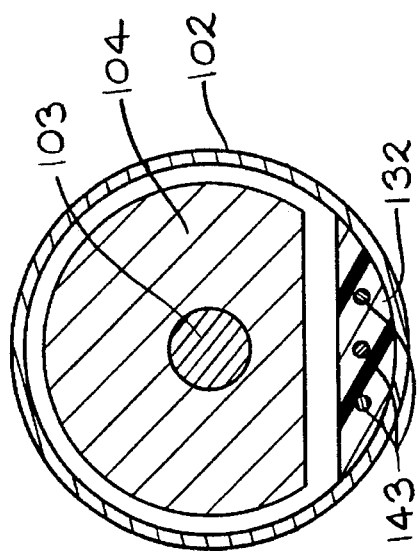
FIG. 9
FIG. 9B
FIG. 9A

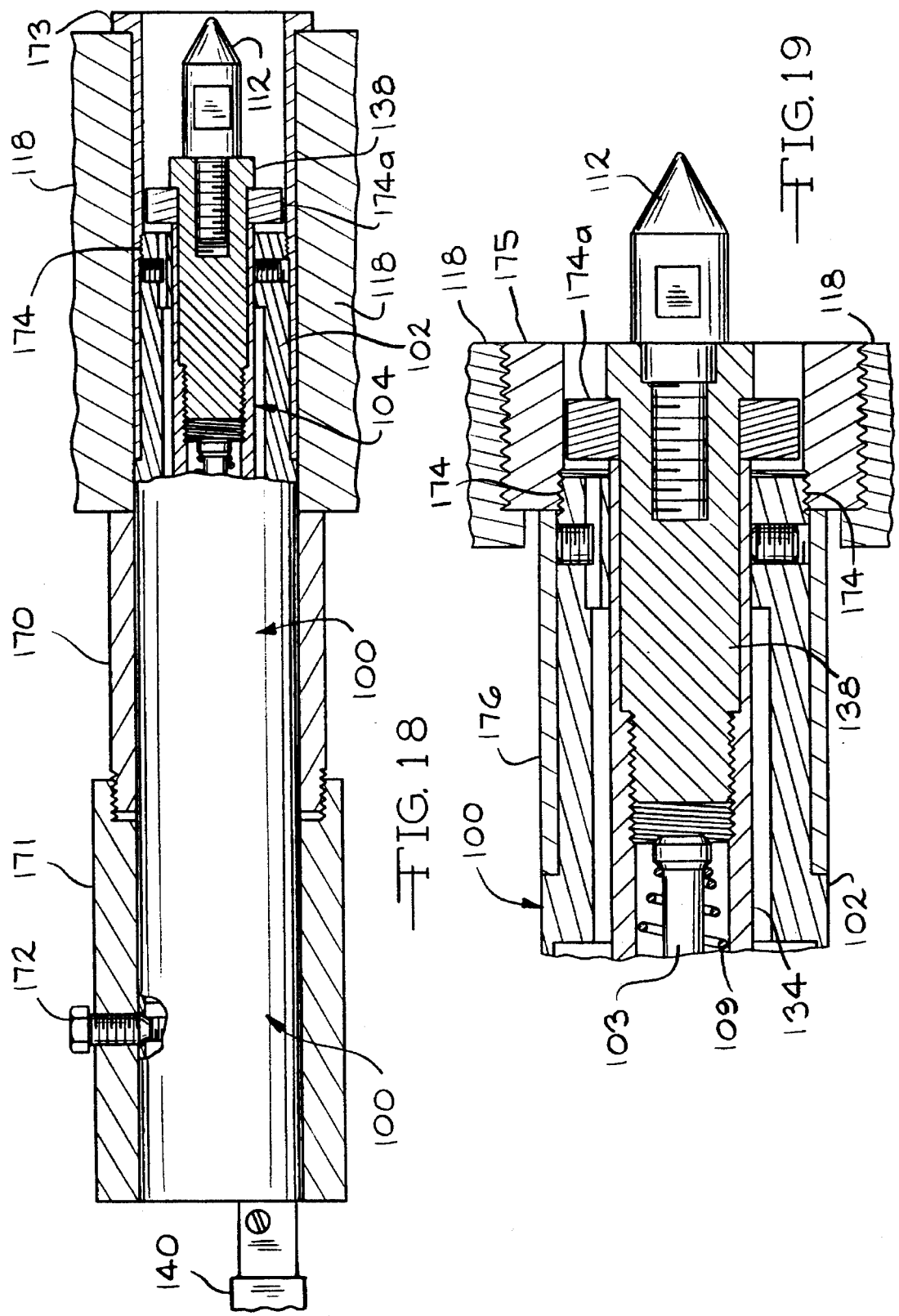

CONTINUOUS AIR FLOW PROBE TRANSDUCER GAGE ASSEMBLY

This invention relates to a probe transducer gage assembly whereby a continuous selectively controlled flow of air passes through the probe transducer gage assembly so as to selectively actuate the spring-biased air piston probe slidably mounted therein from its retracted position into its extended floating soft contact measuring position against a part being measured.

Further, this invention relates to a probe transducer gage assembly having a rest position continuous low pressure air flow mode whereby low pressure air continuously flows through the probe transducer gage assembly so as to keep all parts thereof clean.

Further, this invention relates to a probe transducer gage assembly having a calibration mode maximum volume air flow mode whereby a maximum air flow selectively passes through the probe transducer gage assembly so as to selectively actuate the slidably mounted spring-biased air piston probe assembly into its full extended calibration position.

Further, this invention relates to a probe transducer gage assembly having an operative selectively increased intermediately volume air flow mode whereby a selectively increased air flow selectively actuates the slidably mounted spring-biased air piston probe assembly into its floating soft contact measuring position against the part being measured.

Further, this invention relates to a probe transducer gage assembly provided with an air inlet and selectively positioned air outlet valves and/or air exit passages so as to permit a continuous flow of air through the transducer gage assembly while selectively actuating the slidably mounted spring-biased air piston probe assembly into its floating soft contact measuring position against the part being measured.

Further, this invention relates to a probe transducer gage assembly having an internal slidably mounted air piston probe assembly which is spring-biased in a retracted rest position and selectively extends outwardly into its extended soft contact measuring position against a part positioned proximate thereto when a selectively increased air flow acts on the air piston probe assembly.

Further, this invention relates to a probe transducer gage assembly whereby the slidably mounted air piston probe assembly is spring-biased on a bearing shaft and is provided with spring reversibility and ease of changeability capabilities.

Further, this invention relates to a probe transducer gage assembly whereby a calibration screw assembly is provided which sets the rearward travel of the slidably mounted spring-biased air piston probe assembly on the bearing shaft so as to set the exact mechanical stroke of the spring-biased air piston probe assembly, thereby making possible the easy calibration of the electrical stroke.

Further, this invention relates to a probe transducer gage assembly whereby the transducer housing is provided with a potentiometer assembly internally fixedly mounted longitudinally therealong and which is operatively engaged by a wiper element extending from the slidably mounted spring-biased air piston probe assembly selectively moving in a parallel spaced-apart relationship in operative use position over the fixed potentiometer assembly.

Further, this invention relates to a probe transducer gage assembly whereby the measuring distance traveled by the air flow actuated spring-biased air piston probe assembly is converted into an electrical voltage through the potentiometer assembly so as to provide an electrical input into an associated computer assembly which has been programmed to generate a volts per millimeter scale, thereby producing an accurate measurement against a part being measured which is automatically achieved.

It is thus seen that the use of a selectively variable flow of air through this unique transducer gage assembly to selectively actuate a spring-biased air piston measuring probe provides a transducer gage assembly having many advantages.

The rest position continuous low pressure air flow selectively passing through the transducer gage assembly keeps it cool and clean. Further, the transducer gage assembly does not tend to stick because there is no O-ring or seal utilized in the structure thereof.

Another advantage is the use of selectively increased air flow to actuate the spring-biased air piston causing the piston probe to "float" up to its measuring position, thus avoiding the relatively hard "snap" contact inherent in the use of other solenoid or mechanical contact probes. This "floating" or "soft contact" capability of this unique air flow actuated transducer gage assembly eliminates damage to fragile surfaces of parts such as windshields being measured.

None of the probe transducer devices of the known prior art utilize a probe transducer gage assembly such as the instant invention which is provided with air inlet means and air outlet leak means so as to permit a selectively controlled flow of air through the probe transducer assembly so as to selectively actuate a spring-biased air piston probe assembly slidably mounted therein into a controlled floating soft contact measuring position.

Further, none of the transducer gage devices of the known prior art probe transducer gage devices utilize a probe transducer body structure such as the instant invention which is provided with a rest position low volume air flow mode whereby a low pressure air flow passes continuously through the probe transducer assembly in its rest position so as to maintain cleanliness of all parts thereof.

Further, none of the probe transducer devices of the known prior art utilize a probe transducer gage assembly such as the instant invention which is provided with a calibration maximum volume air flow mode whereby a maximum air flow selectively actuates the slidably mounted spring-biased air piston probe assembly into its full extension calibration position In addition, none of the probe transducer devices of the known prior art utilize a probe transducer body structure such as the instant invention which is provided with an operative selectively increased intermediate air flow mode therethrough so as to selectively actuate the slidably mounted spring-biased air piston probe into a floating soft contact measuring position against the part being measured.

The known prior art transducer gage devices have a measuring probe which inherently makes a hard contact snap engagement with the part being measured regardless of whether the spring-biased probe is actuated by a burst of air pressure, by a solenoid or is otherwise mechanically actuated. In contrast, the claimed probe transducer gage assembly of applicant is provided with a continuous controlled selectively variable air flow therethrough so as to selectively move the slidably mounted spring-biased air piston from its rest position into a floating soft measuring contact with the part being measured.

Another advantage of this invention is the provision of computer controlled selectively variable air flow modes through the probe transducer gage assembly. The unique use of the computer assembly to control the selective air flow modes has several advantages.

Inasmuch as the unique transducer is purposely designed to allow continuous free passage of air therethrough, it selectively works in three distinct modes under the control of the computer means.

In the rest air flow mode, the air flow is selectively controlled so as to continuously move through the probe transducer assembly, but the air flow is selectively limited so that the force exerted on the floating slidably mounted probe is not sufficient to displace it from its restricted rest position within the probe transducer assembly.

In the calibration air flow mode, the air flow is selectively increased to its maximum flow, whereby the force exerted thereby on the floating probe is sufficient to cause the snap extension of the floating probe into its maximum extension calibration mode.

In the operative intermediate measuring air flow mode, the air flow is selectively increased to create enough force to floatingly displace the transducer probe so that it extends to make a soft contact against the part being measured. The transducer probe moves slowly and exerts very low contact force so that when it touches a part, it will stop immediately without causing damage thereto.

It is useful to use the computer to regulate these modes for the following reasons:

1) during the calibration procedure (i.e. comparing the 10 mm mechanical span to an electrical voltage span) the transducer needs to move from fully retracted to its fully extended mode. By using the computer to regulate this process, the calibration procedure can be accomplished almost instantly, and does not require the movement of probes manually or individually.

Because the probe transducer gage assembly is designed to provide a continuous flow of air flow therethrough, the margin of air volume needed to work is much larger. Since a relatively larger volume of air is used, (as opposed to a sealed cylinder which has no "float" position) the relatively simple procedure of controlling only a few air valves still allows for very satisfactory system performance under a variety of operating conditions.

The air cylinder controlled probe transducers of the known prior art have only two modes of operative action, i.e. either "on" or "off." Furthermore, the movement to the "on" position is characterized by a snap action which causes the transducer probe to make an uncontrolled "hard" (damaging) contact with the surface of the part being measured.

In contrast, the computer controlled air float mode system of the instant invention is characterized by a transducer probe which is controllably floated into its measuring position so as to make a soft (non-damaging) contact with the surface of the part being measuring. This advantage is particularly important when the part being measured is a pane of glass, such as a windshield.

Another advantage of having a computer controlled selectively variable air flow mode probe transducer gage assembly is that the operator is able to watch a constant readout on the computer screen. This enables the operator to manually adjust the placement of the part in the fixture while observing real time transducer probe data. This ability to manually adjust the part into its final rest position in the fixture results in a larger number of "acceptable" parts.

A need has therefor existed for a probe transducer gage assembly which is configured to permit a continuous selectively controlled air flow therethrough so as to selectively actuate the spring-biased air piston probe mounted therein from its retracted position into its extended floating soft contact measuring position against a part being measured without damage to the part being measured.

Other objects and advantages found in the construction of the invention will be apparent from a consideration of the specification in connection with the appended claims and the accompanying drawings.

IN THE DRAWINGS

FIG. 1 is a schematic view of the continuous air flow probe transducer gage assembly showing the slidably mounted spring-biased air piston probe assembly in its retracted rest position.

FIG. 2 is a schematic view of the transducer assembly showing the slidably mounted spring-biased air piston probe assembly in its fully extended calibration position.

FIG. 3 is a schematic view of the transducer assembly showing the slidably mounted spring-biased air piston probe assembly in its selectively extended operative use measuring position against the part being measured.

Figure 4:
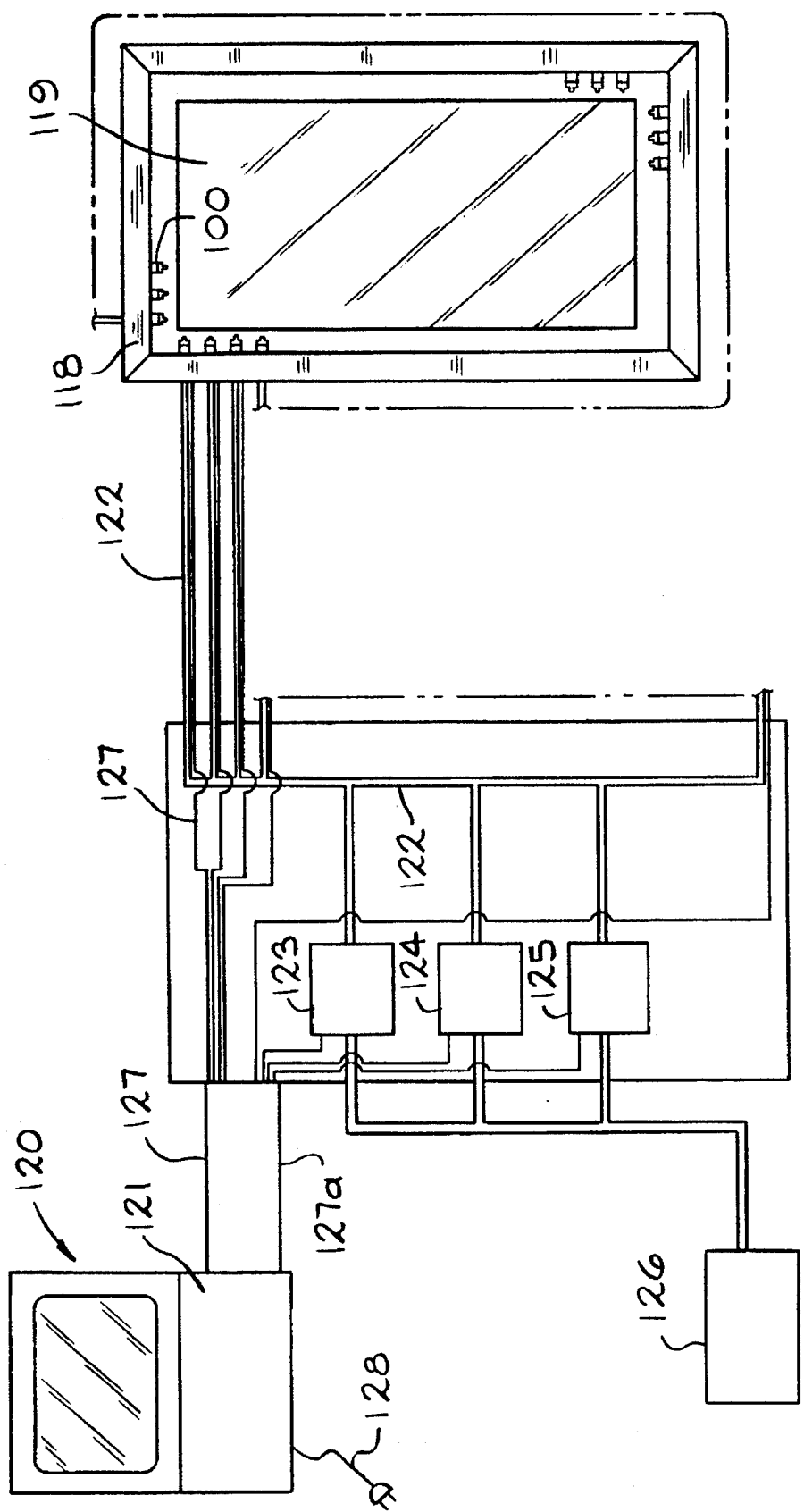
FIG. 4 is a schematic view showing a plurality of the air flow probe transducers mounted in their operative use measuring positions on a fixture and showing the computer controlled air flow actuating valves and electronic measuring data systems.
Figure 4A:
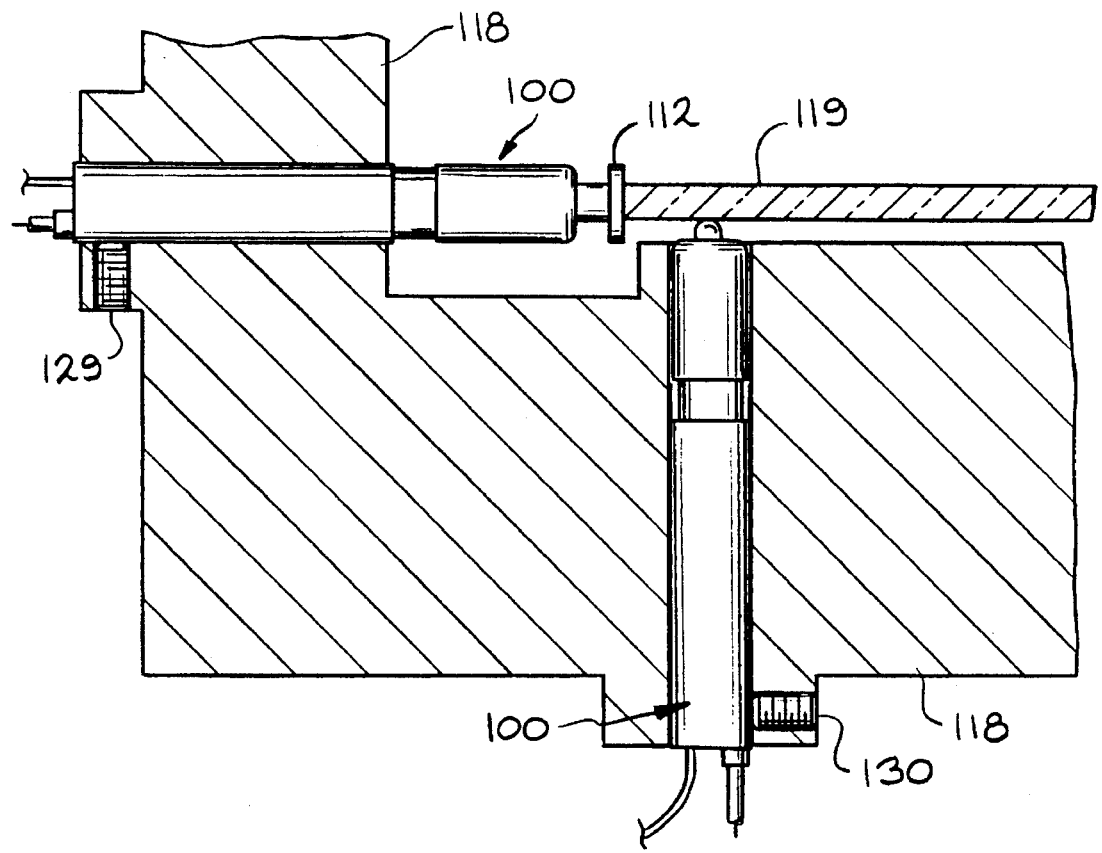

FIG. 4A is an enlarged partial schematic view of the fixture assembly as shown in FIG. 4 showing a representative horizontally oriented fixture mounted air flow probe transducer in its operative use measuring position against the side of a part (fixture mounted glass windshield) being measured and a representative fixture mounted vertically oriented air flow probe transducer in its operative use measuring position against the bottom of the part being measured.

FIG. 5 is an external perspective view of the assembled continuous air flow probe transducer assembly.

FIG. 6 is an exploded perspective schematic view of the structural elements comprising one embodiment of the continuous air flow probe transducer assembly.

Figure 7:
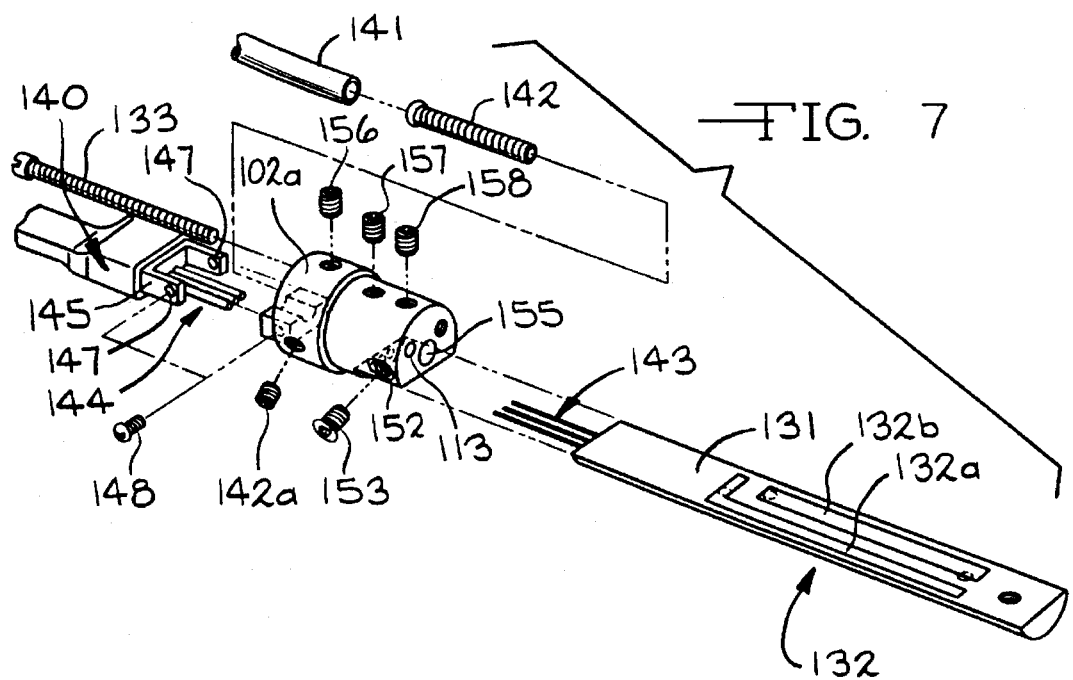

FIG. 7 is an exploded schematic view of the potentiometer element of the continuous air flow probe transducer assembly showing the selective probe electrical wire disconnect capability.

Figure 8:
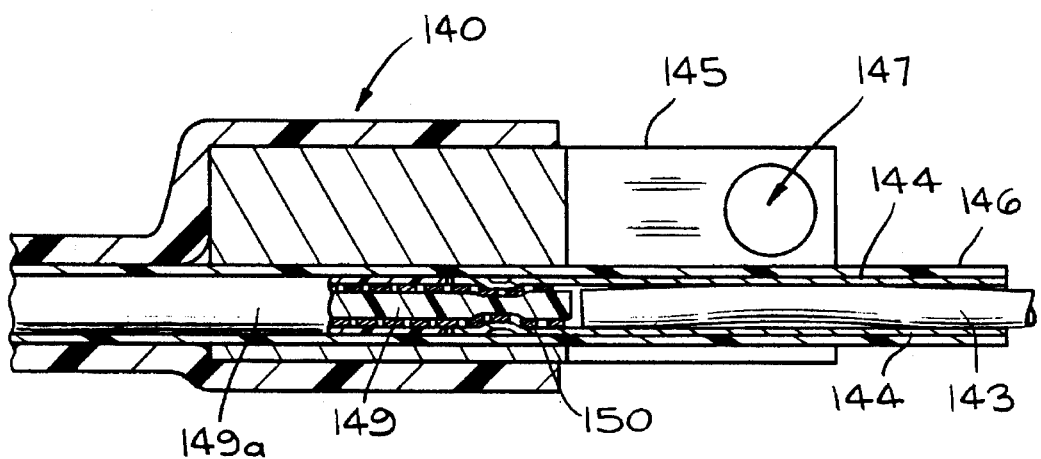

FIG. 8 is a partial cross-sectional schematic view of the wire disconnect assembly shown in FIG. 7.

FIG. 9 is a cross-sectional schematic side view of an embodiment of the assembled continuous air flow probe transducer gage assembly showing the air piston probe in its rest position.

FIG. 9A is a schematic cross-sectional view taken on line 9A—9A of FIG. 9 showing the rear portion of the air piston probe in slidable bearing engagement with the main support shaft.

FIG. 9B is a schematic cross-sectional view taken on line 9B—9B of FIG. 9 showing the forward portion of the air piston probe in slidable bearing engagement with the front housing wall.

Figure 10:
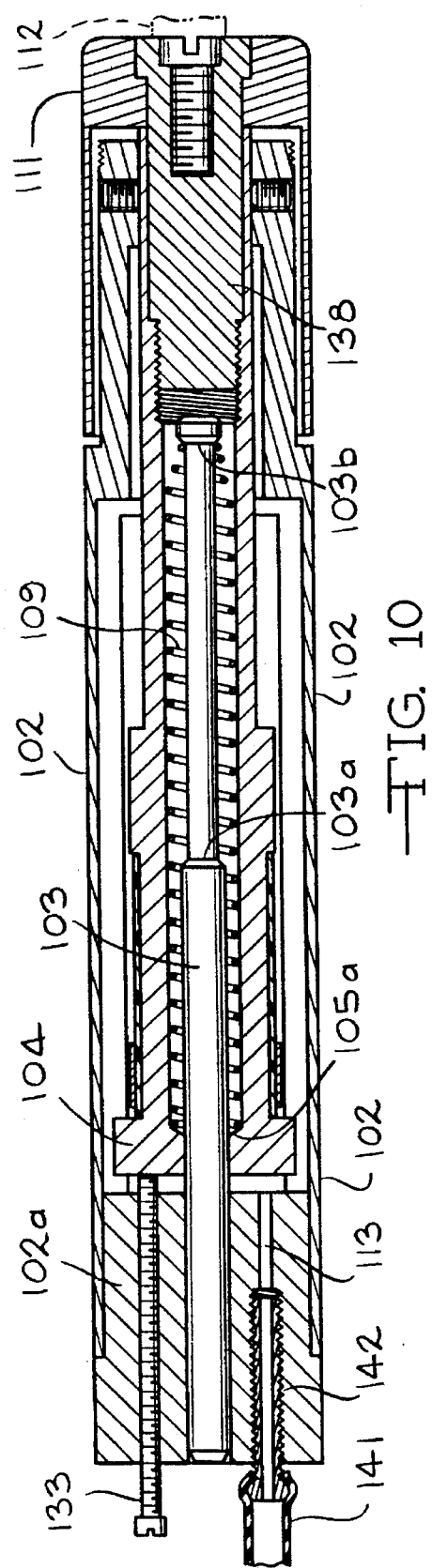

FIG. 10 is a cross-sectional schematic top view of the assembled continuous air flow probe transducer showing the rear travel calibration screw and air tube connection features.

Figure 11:
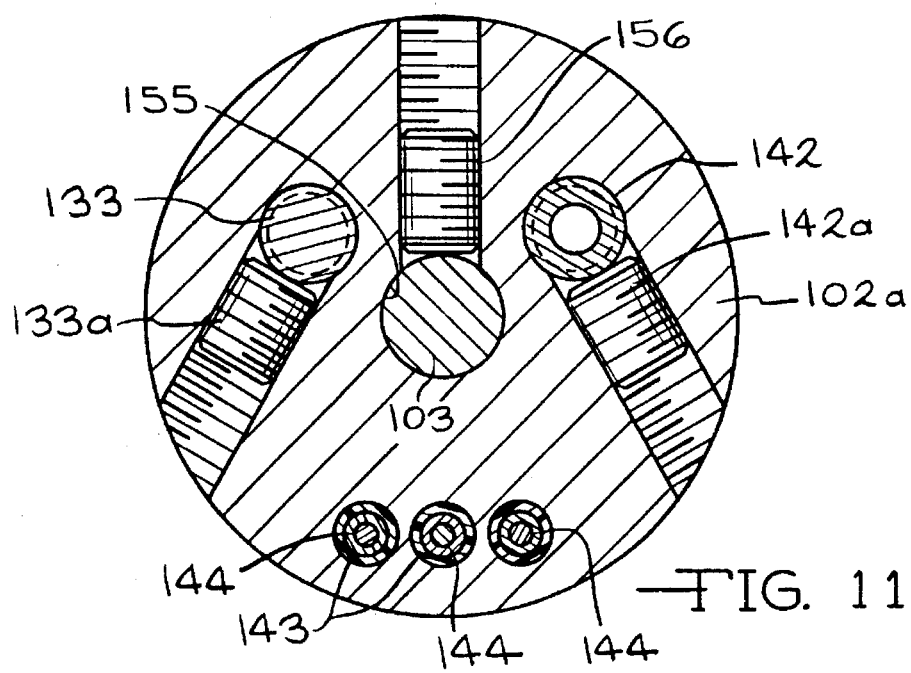

FIG. 11 is a cross-sectional schematic view taken on lime 11—11 of FIG. 9.

Figure 12:
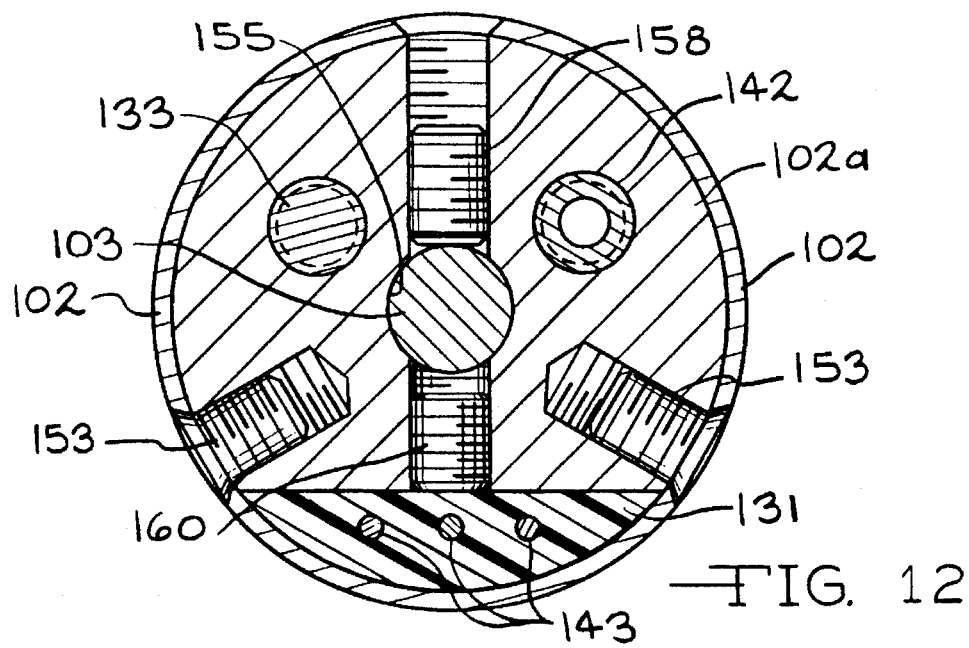

FIG. 12 is a cross-sectional schematic view taken on line 12—12 of FIG. 9.

Figure 13:
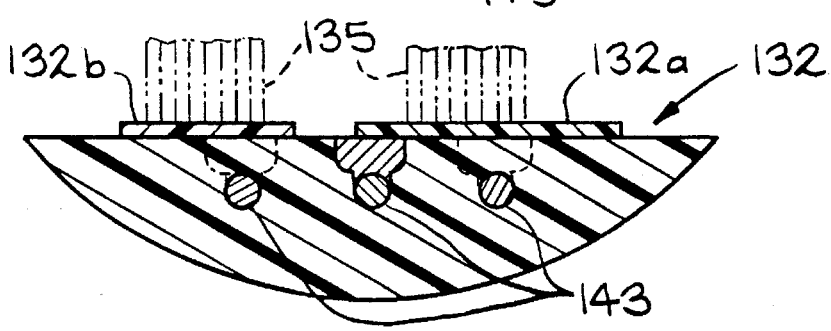

FIG. 13 is a partial cross-sectional schematic view of the potentiometer element showing one method of connecting the electrical supply wires thereto.

Figure 14:
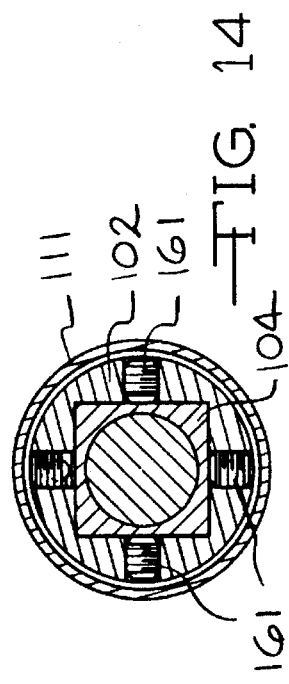

FIG. 14 is a cross-sectional schematic view taken on line 14—14 of FIG. 9.

Figure 15:
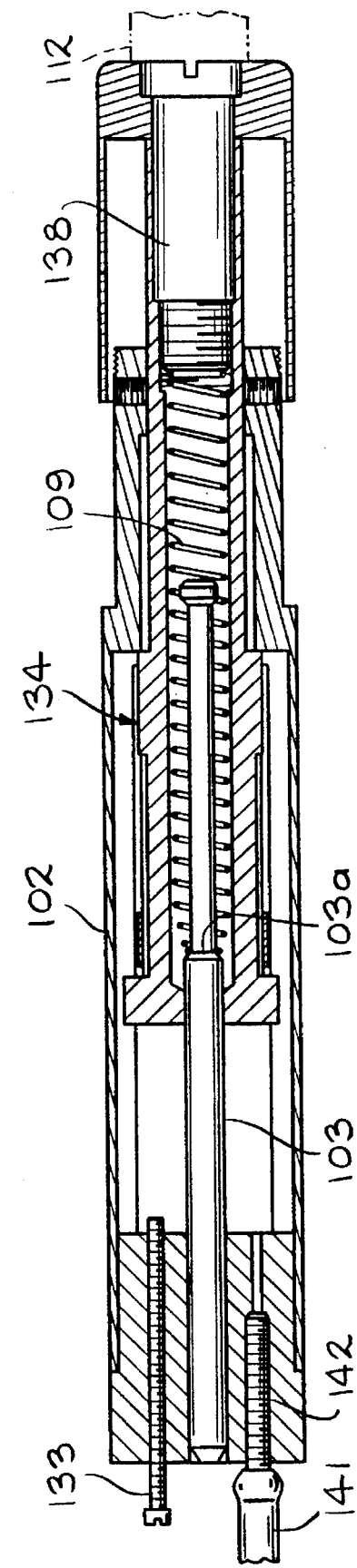

FIG. 15 is a cross-sectional schematic view of the continuous air flow transducer assembly showing the slidable air piston probe in its fully extended use position and the spring thereof mounted in its reverse position.

Figure 16:
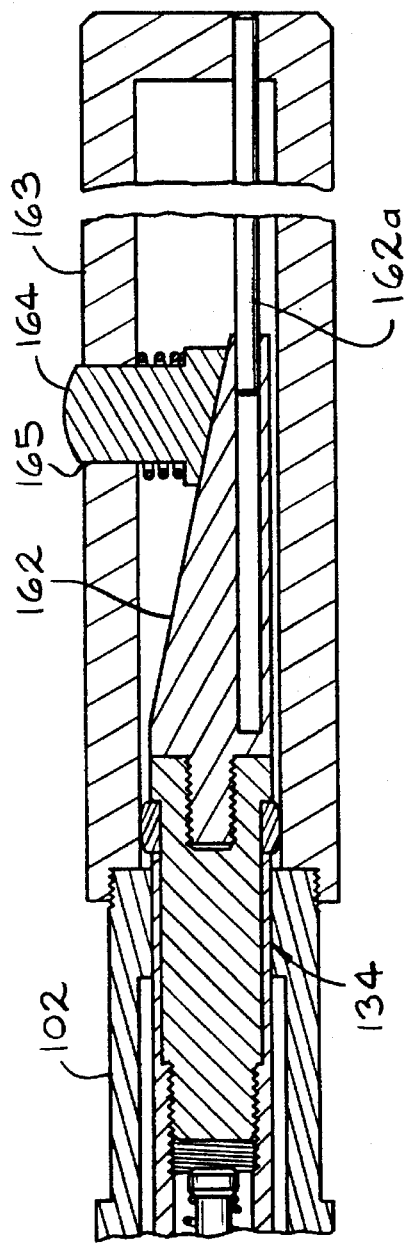

FIG. 16 is a partial cross-sectional schematic view of another embodiment of the continuous air flow transducer assembly showing the ramp actuated transversely extendible measuring probe.

Figure 17:
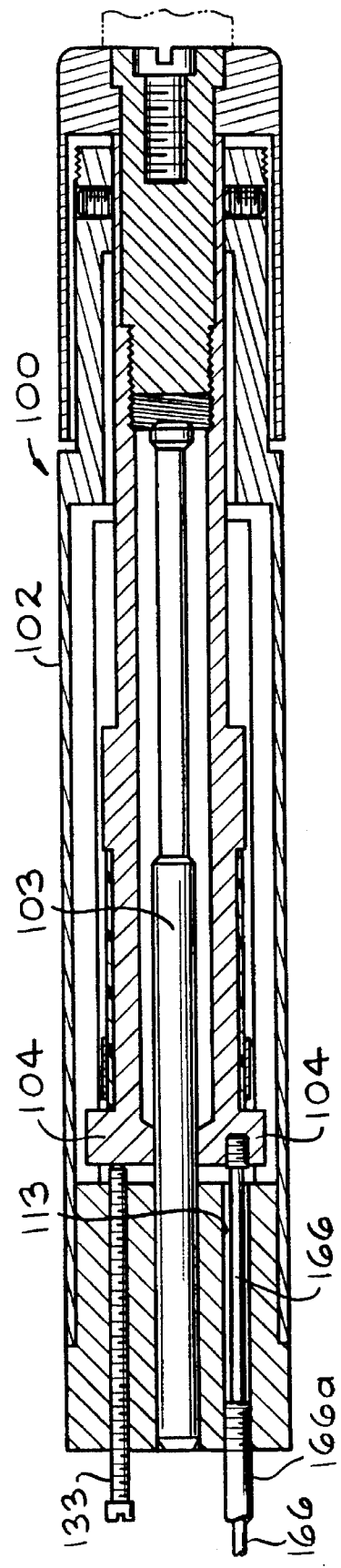

FIG. 17 is a cross-sectional schematic top view of another embodiment of transducer gage assembly showing a cable actuated slidable piston probe provided therein.

Figure 17A:
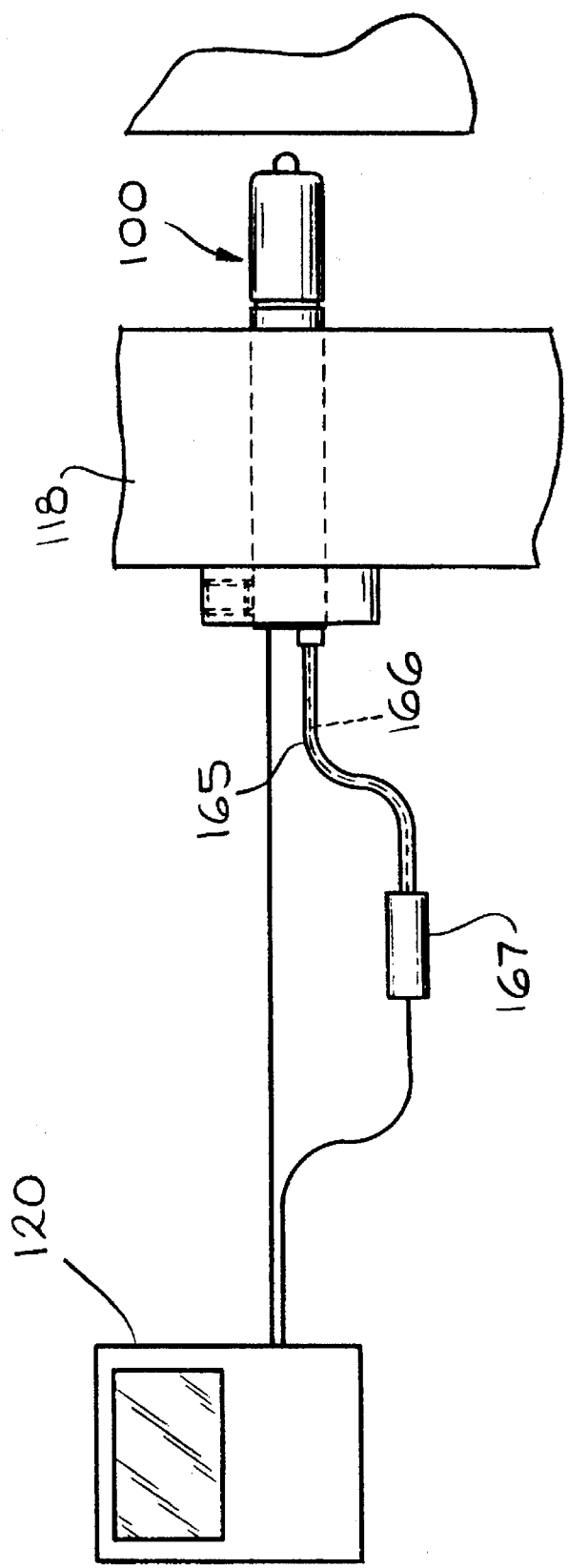

FIG. 17A is a schematic view showing the transducer gage assembly of FIG. 17 in operative engagement with a computer controlled solenoid actuated control cable.

FIG. 18 is a partial cross-sectional view of another embodiment of the continuous air flow probe transducer assembly provided with a fixture engaging sleeve attachment for internal measuring capabilities.

FIG. 19 is a partial cross-sectional view of another embodiment of the continuous air flow probe transducer assembly provided with a collar adapted for threaded engagement with a threaded fixture bore.

DESCRIPTION

As shown schematically in FIGS. 1, 2 and 3, a probe transducer gage assembly 100 is shown whereby a continuous selective controlled flow of air passes through channel 101 provided in the probe transducer gage assembly 100. The probe transducer gage assembly consists of a housing 102. An air piston probe support shaft 103 is fixably provided in engagement with the rear of the housing 102 so as to longitudinally extend forwardly into the internal portion thereof. A hollow air piston probe 104 is slidably provided on the air piston probe support shaft 103. The air piston probe 104 is slidably supported at the rear wall portion 105 thereof in the bore 106 therethrough which engages the support shaft 103. The air piston probe 104 is slidably supported at a forward portion thereof as it slidably extends through a bore 107 provided in a forward end wall portion 108 provided in the housing 102.

A biasing spring 109 is provided along the support shaft 103 so as to urge the air piston probe 104 toward its normal retracted rest position within the probe transducer assembly housing 102. As shown schematically in FIGS. 1, 2 and 3, the biasing spring 109 is adapted to engage the internal surface 105a of the rear wall 105 of the air piston probe 104 and the spring engaging annular flange member 110 provided at the forward end of the probe support shaft 103, thus acting to retractably urge the air piston probe 104 toward its normal retracted rest position.

The forward end of the air piston probe 104 is provided with a fixedly mounted cap portion 111 which extends rearwardly external of the forward end of the housing 102.

The air piston probe 104 is provided with a fixed part contact member 112 which contacts the part being measured as the air piston probe 103 floats outwardly into its floating soft contact measuring position when the air piston probe 103 is actuated by an increased air flow moving through the probe transducer assembly 100. Although the part contact member 112 schematically shown in FIGS. 1, 2 and 3 has a pointed configuration, it can have a flat button-like or curved configuration depending on the surface configuration of the part being measured.

The transducer housing 102 is hollow and coacts generally with the internally mounted slidable air piston probe 104 to define the air flow channel 101 therethrough. Air flow inlet means 113 are provided through the rear of the transducer housing 102 to permit the introduction of a selectively variable air flow through the air flow channel 101 so as to selectively permit a continuous flow of air through the entire length of the air flow probe transducer assembly 100 and outwardly through the air outlet means 114 provided at the front end of the transducer housing 102.

As also shown schematically in FIGS. 1, 2 and 3, the slidable air piston probe 104 is integrally provided with annular stop means 115 on the central portion thereof. The annular stop means 115 provides a side surface 116 which is adapted to engage a corresponding inwardly depending limit stop means 117 provided in the transducer gage housing 102 so as to limit the fully extended travel of the air piston probe 104 when acted upon by a selectively supplied maximum calibration air flow through the air flow channel 101 of the probe transducer gage assembly 100 as schematically shown in FIG. 2.

Although the operation of the probe transducer gage assembly 100 in its operative use setting will be described hereafter in greater detail, the description with respect to the schematic drawings of FIGS. 1, 2 and 3 illustrates the basic overall concepts embodied in this embodiment of the invention.

The schematic drawing of FIG. 1 illustrates the air flow transducer gage assembly 100 with the air piston probe 104 in its fully retracted rest position without any air flow therethrough. When the air flow probe transducer gage assembly 100 is engaged in its operative use position as hereinafter described, a continuous low volume air flow is passed through the transducer gage assembly 100 which keeps the probe transducer gage assembly 100 from being contaminated by harmful dust, dirt and other contamination which could damage the probe transducer gage assembly. The low volume air flow is not of sufficient force to actuate the air piston probe 104 from its rest position, but is sufficient to prevent the transducer gage assembly 100 from being damaged by airborne contaminants in the operative use environment.

The schematic view of FIG. 2 illustrates the air piston probe 104 in its operative use fully extended calibration position as acted upon the passage of a selective (selectively supplied) maximum air flow through the probe transducer assembly 100. The calibration procedure will be described hereafter.

The schematic view of FIG. 3 illustrates the air piston probe 104 in its soft contact measuring position against the part being gaged with the air piston probe 104 actuated by the selective (selectively supplied) measurement mode continuous air flow passing through the probe transducer gage assembly 100.

As shown in FIG. 4, a computer controlled probe transducer gage assembly is provided whereby a plurality of air flow probe transducer assemblies 100 are mounted on a fixture assembly 118 so as to selectively provide a gage measurement of a part 119 positioned in the fixture 118.

A computer control assembly 120 having a keyboard and interface panel 121 is provided in operative electrical engagement with each of the individual probe transducer gage assemblies 100.

The computer control assembly also provides electricity through electrical lines 127a to electrically operate rest mode air flow control valve 123, calibration mode air flow control valve 124, and measuring mode air flow control valve 125 so as to produce air flow through individual air flow lines 122 connected to each of the air flow transducer gage assemblies 100. The computer control assembly 120 is further adapted to selectively control rest mode, calibration mode and measuring mode air flow control valves 123, 124, and 125, respectively, so as to selectively deliver rest position air flow mode, calibration position air flow mode, and gage measuring position air flow mode continuous air flow to each of the individual air flow probe transducer gage assemblies 100, as required.

While FIG. 4 shows a rest.

mode air flow control valve 123, a high volume calibration mode air flow control valve 124, and a measuring mode air flow control valve 125, it is within the scope of the invention to provide a single variable air control valve (not shown) to selectively provide the foregoing air flow modes to the individual probe transducer gage assemblies 100 as controlled by the computer control assembly 120.

A plant air supply assembly 126 provides a continuous air flow supply to the air flow control valves 123, 124, and 125 as required.

The computer control assembly 120 also provides electricity through electrical lines 127 to electrically excite the individual transducer gage assemblies 100 as required.

The computer assembly 120 is powered by electrical supply means (not shown) engaged by electrical plug means 128 attached to the computer assembly 120.

As shown in the enlarged partial schematic sectional side view of FIG. 4A, a fixture 118, such as that shown in FIG. 4, supports a windshield part 119 being gaged therein. A representative horizontally oriented fixture mounted transducer gage assembly 100 is shown in its gage measuring position with its contact member 112 against the edge portion of the wind shield part 119 which is positioned in the fixture 118. The horizontally oriented transducer gage assembly 100 is retained in its horizontal operative use position on the fixture 118 by use of a lock set screw 129. Thus mounted, the horizontally oriented transducer gage assembly 100 is representative of multiple ones of the transducer gages mounted on the fixture 118 of FIG. 4.

The vertical oriented transducer gage 100 is selectively mounted on the fixture 118 so as to make measuring gage contact with the bottom surface of the windshield 119. The vertically oriented transducer gage 100 is retained in its operative use position on the fixture 118 by use of a lock set screw 130. This vertical oriented transducer gage 100 is representative of other transducers similarly selectively positioned on the fixture 118 so as to provide gaging measurement data to the computer control assembly 120 so as to measure the size and shape of windshield 119 positioned in the fixture 118.

As shown in the external perspective view of FIG. 5, the assembled air flow probe transducer gage assembly 100 has a main body housing 102 and a selectively extendible air flow actuated air piston probe assembly 134, as shown in phantom-line.

As further shown in the exploded schematic view of FIG. 6, an air piston probe support shaft 103 has spring engaging annular rear and forward wall portions 103a and 103b, respectively. A fixed potentiometer support member 131 is provided within the main body housing 102. The potentiometer assembly 132 positioned thereon will be described hereinafter. An adjustable calibration stop screw 133 is provided through the rear main body housing member 102a so as to limit the rearward travel of the slidable air piston probe assembly 134. The slidable air piston probe assembly 134 carries a downwardly extending wiper member 135 which operatively engages the potentiometer assembly 132. A biasing spring 109 is provided which operatively engages the slidable air piston probe assembly 134 as will be hereinafter described. The air piston probe assembly 134 is provided with a removable cap 111. A cap retainer screw 138 is provided for threaded engagement with the air piston probe assembly 134. Another embodiment of the contact tip member 112 is provided with a flat contact surface adapted for parts having a flat edge surface such as windshields 119. This is also shown in FIG. 4A.

A quick disconnect plug assembly 140 is provided for selective electrical operative engagement and disconnect from the contact wires of the potentiometer assembly 132.

As shown in the exploded schematic view of FIG. 7, and as previously discussed with respect to FIG. 6 the fixed potentiometer support member 131 is provided within main body housing 102. The potentiometer contact surfaces 132a and 132b are provided thereon and are supplied by electrical energy through the pin wires 143.

The wire pin contact members 143 are operatively connected to the wiper contact surfaces 132a and 132b of the potentiometer assembly 132.

Another important feature of the invention is the electrical disconnect modular plug assembly 140 which is adapted to make selective engagement and disengagement with the potentiometer circuit board pin members 143. The disconnect plug assembly 140 is provided with electrical metal tube contact members 144 which are adapted to make electrical contact with the pin wire members 143 that are selectively received within the tube contact members 144.

As shown in the partial cross-sectional schematic side view of FIG. 8, the electrical disconnect modular plug assembly 140 is provided with a u-shaped connector element 145 which is adapted to engage the rear main body housing member 102a.

The legs of the u-shaped connector element are provided with screw openings 147 adapted to receive lock screws 148 therethrough. The electrical disconnect modular plug 140 is thus lockably connected to the transducer gage assembly 100 as shown in phantom-line in FIG. 7.

As further shown in FIG. 8, the metal tubes 144 are insulated by a heat shrink insulation coating 146. The contact ends of the wire pin contact members 143 are spring biased so as to make a positive electrical contact with the inner surface of the electrical metal tube contact members 144 when inserted thereinto.

The electrical supply wires consisting of a core 149 wrapped by metal foil 150 and an insulated coating 149a are received into the modular plug 140. The metal tubes 144 are crimped around the parts 149 and 150 so as to maintain them in electrical contact within the metal tubes 144.

An air supply tube 141 is adapted for stretch-fit engagement with a threaded hollow connector 142, which in turn is adapted to make selective threaded engagement with the air flow inlet channel 113 provided in the rear main body housing member 102a. A set screw 142a is provided to secure the connector 142 at a desired location.

The rear main body housing member 102a is also provided a threaded opening 152 so as to receive the outer cover attaching screw 153 when the transducer gage 100 is assembled.

The air inlet passage 113 is provided through the rear main body housing member 102a so as to deliver the air flow into the interior of the transducer as previously discussed. The support shaft opening 155 is adapted to receive the support shaft 103 therethrough.

As shown in the cross-sectional side schematic view in FIG. 9 of the assembled continuous air flow probe transducer gage assembly 100, the air piston support shaft 103 is provided with spring engaging rear and forward wall portions 103a and 103b, respectively. The air piston main bearing support shaft 103 is fixedly attached to the rear main body housing member 102a by use of set screws 156, 157 and 158, respectively.

The potentiometer circuit board assembly 132 is fixedly attached within housing 102 in a parallel spaced apart operative use position to the air piston support shaft 103. Circuit board assembly 132 is held in its operative use position by a forward screw 159 and a rear clamp set screw 160.

The hollow air piston probe 104 is slidably mounted on support shaft 103. An electrical wiper member 135 extends downwardly from the air piston probe body into operative engagement with the surface of the potentiometer assembly 132.

A biasing spring 109 is provided in axial alignment with the support shaft 103.

The forward end of biasing spring 109 operatively engages the spring engaging annular forward wall portion 103b of the support shaft 103. The rear end of the biasing spring 109 engages internal rear wall surface 105a of the air piston body 104 to urge the air piston probe 104 toward the retracted rest position thereof.

An air flow closure screw 104a is provided so as to be able to selectively control the flow of air through the air outlet channel 101, as desired.

Cap retaining screw 138 is provided with a threaded center bored hole 139 for receiving various contact tips 112.

As further shown in FIG. 9, sectional views are taken along lines 9A—9A, 9B—9B, 10—10, 11—11 and 12—12, respectively, and will be discussed hereafter.

The sectional view of FIG. 9A taken along lines 9A—9A of FIG. 9 shows that the rear portion of the air piston probe 104 is slidably supported along the support shaft 103. This cross-sectional view also shows the circuit board assembly 132 in its fixed position on the internal portion of the housing 102. The wire pin contact members 143 are shown passing through.

The sectional view of FIG. 9B taken along lines 9B—9B of FIG. 9 shows that the forward portion of the air piston probe 104 is slidably supported by the bearing bore 107 through housing body 102.

The sectional view of FIG. 10 is a top view taken along lines 10—10 of FIG. 9. The calibration adjustment stop screw 133 is shown in its operative use position so as to limit the rearward travel of the air piston probe 104. The air supply tube 141 is shown in operative engagement with the hollow connector 142 which is in threaded engagement with the air flow inlet channel 113 provided in the rear main housing member 102a.

As shown in the cross-sectional schematic view of FIG. 11 as taken on line 11—11 of FIG. 9, the air piston support shaft 103 is shown in its fixed operative use position through the bore 155 provided through the rear main body housing member 102a. The air piston support shaft 103 is retained in its fixed operative use position by set screw 156. The electrical metal tube contact members 144 are shown in their operative use position. The calibration stop screw 133 and the calibration lock screw 133a are also shown in their operative use position through the rear main body housing member 102a. The hollow air tube connector 142 and the air tube connector lock screw 142a are also shown in the operative use position through the rear main body housing member 102a.

As shown in the cross-sectional schematic view of FIG. 12 taken on line 12—12 of FIG. 9 air piston support shaft 103 is retained in its fixed operative use possession through the rear main body housing member 102a by set screw 158. The rear main body housing member 102a is retained in its fixed use position within the body housing 102 by a pair of the screws 153. The circuit board base 131 is shown held in its fixed operative use position within the housing 102 by the rear clamp set screw 160 with the electrical contact pin wires 143 passing through the circuit board base 131.

FIG. 13 is a partial schematic cross-sectional view of the potentiometer assembly 132 showing one method of connecting the electrical contact pin wires 143 to the elongated carbon strip elements 132a and 132b provided on the surface of the potentiometer assembly 132. The wiper elements 135 provided on the slidable air piston probe 104 are adapted to make slidable contact with the carbon strip elements 132a and 132b as shown.

As shown in the cross-sectional schematic view of FIG. 14 taken on line 14—14 of FIG. 9, the adjusting screws 161 are provided through the body portion 102 so as to adjust the fit of the air piston probe 104 passing therethrough.

As shown in the cross-sectional schematic view of FIG. 15, the slidable air piston assembly 134 is shown in its fully extended position with the spring 109 in its reverse position with the rear end of the spring 109 bearing against the rear support wall 103a of the support shaft 103 and the forward internal wall portion of the air piston assembly 134 and tip 112 in its fully extended rest position. Thus, this sideable air piston assembly 134 and tip 112 thereof move rearwardly when the part being measured is moved thereagainst.

As shown in partial cross-sectional schematic view of FIG. 16, another embodiment of the continuous air flow transducer gage assembly is provided with a ramp extension member 162 which is mounted on the forward end of the slidable air probe assembly 134 so as to extend outwardly therefrom and is guided by a ramp support pin 162a. A transverse prove housing 163 is provided for threadable engagement with the transducer body 102. A spring-biased transversely extending probe element 164 is provided in the housing 163 so as to extend outwardly transversely through an opening 165 provided in the housing 163. The base of the probe element 164 is in operative sliding engagement with the ramp extension member 162 so that when the ramp extension member 162 moves forward, the transverse probe 164 is caused to make a corresponding transverse gaging contact with a part positioned proximate thereto.

As shown in the cross-sectional schematic top view of FIG. 17, another embodiment of the transducer gage assembly showing a cable actuated slidable piston probe 104 provided therein. A cable 166 is provided having a flexible exterior 166a which is adapted to threadably engage the air inlet opening 113. The cable 166 extends through the air inlet opening 113 so as to make threaded operative use engagement with the rear of the slidable air piston probe 104. In the cable actuated transducer gage assembly 134, the biasing spring component 109 is eliminated. Further, there is no air flow actuation involved in the gaging operation of this cable actuated transducer embodiment. The cable 166 actuates the piston probe 104 to extended measuring and calibration positions and positively retracts the piston probe 104 to a retracted position. The piston probe 104 of the other described embodiments may easily be modified to operate under cable control by fixing a cable thereto.

As indicated above, there is no air flow actuation of this cable actuated transducer embodiment, hence the piston probe 104 need not act as a piston, or even be in the shape of a piston. Therefore, as used in this application, the term "piston probe" should be interpreted in the case of cable actuated transducer probes to mean any type of extensible member, and not just those in the shape of a piston. It should be further noted that although there is no air flow actuation of this cable actuated transducer embodiment, preferably there will be a low flow of air supplied to the transducer to prevent dirt and other contaminants in the ambient surroundings of the transducer from contaminating the internal surfaces of the transducer.

As shown in the schematic view of FIG. 17A, the cable actuated gage assembly is shown in operative engagement with a solenoid 167 which is selectively actuated by the computer control assembly 120.

The modified embodiments of the transducer gage assemblies shown in FIGS. 18 and 19, and as hereinafter described, pertain to transducers which have been modified to coact with fixture engaging means for selective mounting of the modified transducers in their operative use positions on a fixture 118.

As shown in the partial schematic cross-sectional view of FIG. 18, another embodiment of the probe transducer gage assembly 100 is shown which is adapted for mounting on a fixture 118. A fixture engaging sleeve 173 is provided which is adapted for insertion within a bore provided in the fixture 118. As shown, an annular lip is provided to engage the fixture 118 upon insertion into the bore provided in the fixture 118.

A portion of the interior of the sleeve 173 is correspondingly threaded so as to matingly engage a threaded portion of the outer transducer gage assembly at 174. An adjustment sleeve 170 is fitted over the transducer gage 100 so as to threadably engage a rear lock collar 171 that is also fitted over the rear of the transducer gage 100. A transducer engaging lock screw 172 is provided to threadably engage a lock screw threaded hole provided in the transducer gage. The adjustment sleeve 170 may be rotated relative to the locking sleeve 171, thereby acting between the fixture 118 and the locking sleeve 171 to firmly lock the prove transuducer gage assembly 100 with its attached fixture engaging sleeve 173 within the bore in the fixture 118. Thus, the transducer gage assembly 100 is securely positioned in its operative use gaging position within the fixture engaging sleeve 173 which is fixedly mounted on the fixture 118. A spacer ring 174a is utilized to properly position the air piston probe cap retaining screw 138 in its operative use position.

As shown in the partial schematic cross-sectional view of FIG. 19, another embodiment of the probe transducer gage 100 is shown which is adapted for selective fixed mounting in its threaded operative use position within a fixture 118. This is accomplished by use of a fixture engaging threaded collar 175 which is adapted to threadably engage a probe transducer gage 100 positioned therethrough. A spacer ring 174a is utilized to properly position the air piston probe cap retaining screw 138 in its operative use position. A spacer sleeve 176 is utilized to engage the transducer gage 100 and the threaded collar 175 so as to properly position the transducer gage 100 in its correct gaging position. A portion of the interior of fixture engaging collar 175 is correspondingly threaded so as to engage a threaded portion of the outer transducer gage assembly 100 at 174.

In summary, a continuous air flow probe transducer gage assembly is provided which is adapted to selectively make gage measurements with respect to a part positioned proximate thereto. The continuous air flow probe transducer gage assembly comprises an elongate transducer gage housing assembly which has actuating air inlet means provided through the rear wall portion thereof and which defines air outlet means at the forward portion thereof. The transducer gage housing defines an axially aligned piston probe support shaft bore through the rear wall portion thereof. The transducer gage housing assembly further defines an axially aligned air piston probe receiving bore through the front wall portion thereof. An air piston probe support shaft is fixedly provided through the support shaft bore in the transducer gage assembly rear wall so as to axially extend partially through the gage housing assembly. The air piston probe support shaft is provided with at least one bias spring engaging means at the forward end thereof. A slidable hollow air piston probe assembly is provided which has a piston probe support shaft receiving bore provided through the rear wall thereof. The hollow air piston probe is in slidable rear support engagement with the air piston support shaft which extends through the support shaft bore within said gage housing assembly. The hollow air piston probe is provided in slidable forward support engagement with the piston probe receiving bore provided through the front wall portion of the transducer gage housing. The slidable hollow air piston probe assembly is internally provided with bias spring engaging wall means at the rear portion thereof. The slidable air piston probe assembly and the transducer gage housing assembly coact to define an air flow channel continuously extending longitudinally through the transducer gage assembly from the air inlet means to the air outlet means so as to selectively receive a continuos selective actuating air flow through the transducer gage assembly. Electronic sensing means are provided in selective operative use engagement with the slidable hollow air piston probe assembly and the transducer gage housing assembly so as to convert selective linear mechanical movement of the movable air piston probe within the transducer gage housing assembly into measurable electrical signal changes corresponding to such selective linear mechanical movement of the air piston probe within the transducer gage housing assembly. Bias spring means are concentrically provided along the air piston probe support shaft in operative engagement with the air piston probe assembly and the air piston probe assembly support shaft so as to maintain the air piston probe in its retracted rest position, said bias spring means adapted to controllably permit the air piston probe to extend into a slidable soft contact with an adjacent part being measured when a selective continuous air flow is introduced through said air flow channel so as to actuate the air piston probe assembly into its extended soft contact measurement position against a part positioned proximate thereto.

In another modification of the air flow probe transducer gage assembly, the electronic sensing means comprise a linear potentiometer assembly fixedly positioned with the transducer gage housing assembly in a parallel spaced apart relationship to the slidable hollow air piston probe assembly. The air piston probe assembly is provided with a spring-biased electrical wiper element in operative contact use engagement with the potentiometer so as to convert selective linear mechanical movement of the movable air piston probe within the transducer gage assembly into measurable electrical signals corresponding to such selective linear mechanical operative use contact movement of the air piston probe wiper along the potentiometer.

In another modification of the air flow probe transducer gage assembly, a cap member is fixedly attached at the inside base thereof to the front end of the slidable air piston probe assembly extending externally of the transducer gage housing. The cap is configured to extend rearwardly over the forward portion of the transducer gage housing in a spaced apart relationship thereto so as to define a continuation exit of the air flow channel.

In another modification of the air flow probe transducer gage assembly, a second bias spring engaging wall means is provided on the rear portion of the air probe support shaft. The second bias spring engaging wall means is adapted for selective operative use engagement with the rear end of the bias spring means.

In another modification of the air flow probe transducer gage assembly, a transverse probe housing is provided for threaded fixed engagement with the forward end of the transducer gage housing. A ramp extension member is fixedly provided on the slidable air piston probe so as to selectively extend into the transverse probe housing. The transverse probe housing is provided with a spring-biased transverse probe contact element adapted for operative use transverse extension through a transverse probe opening provided in the wall of the transverse probe housing. The transverse probe contact element has a ramp engagement sloped surface portion at the base thereof which is adapted for operative use engagement with the corresponding ramp extension member.

Another modification of the invention is a probe transducer assembly which has a reversible spring capability which is adapted to selectively make gage measurements with respect to a part positioned proximate thereto. This embodiment comprises an elongate transducer gage housing which has a rear end wall portion and front end wall portion. The transducer gage housing defines a piston probe support shaft receiving bore in the rear wall portion thereof. The front end wall portion of the transducer gage housing defines a piston probe support bearing bore therethrough. A piston probe support shaft is selectively fixedly positioned within the probe support shaft receiving bore. The probe support shaft extends longitudinally partially through the gage housing. The piston probe support shaft is provided with bias spring front end engaging means at the forward end thereof and is provided with bias spring rear end engaging means proximate to the rear portion thereof. A slidable hollow piston probe having rear and front end wall portions is slidably mounted on the support shaft so as to be selectively slidably extendable longitudinally through said gage housing into measuring contact with a part positioned proximate thereto. A reversible bias spring means is concentrically provided along the piston probe support shat in selective operative engagement with the piston probe. The bias spring is adapted the make selective operative contact at the front end thereof with the inside surface of the front end wall portion of the hollow piston probe. The bias spring is adapted to make operative contact at the rear end thereof with the bias spring rear end engaging means provided on the piston probe support shaft so as to selectively retain the piston probe in its forward rest position within the gage housing.

Another embodiment of the invention consists of computer controlled multiple air flow probe transducer gage assemblies which are adapted to selectively make gage measurements with respect to a part positioned on a fixture proximate thereto.

In use, the multiple air flow probe transducer gage assemblies are selectively mounted on a part fixture. The fixture is adapted to retain a part in gage measuring distance proximate to each of the probe transducer gage assemblies. Each of the probe transducer gage assemblies is provided with a slidable air actuated piston probe as described herein. An air supply assembly is provided in operative engagement with each of the air flow probe transducer gage assemblies. The air supply assembly is in operative use engagement with an air flow control valve assembly which is adapted to provide a selectively variable supply of air flow to each of the air flow probe transducer gage assemblies so as to selectively actuate each of the air actuated piston probes into extended floating soft contact measuring position against a part being measured. A computer control center in operative engagement with each of the air flow probe gage transducers and with the air flow control valve assembly so as to control the actuation of each of the air actuated piston probes into soft measuring contact against the part being measured. The computer control center is adapted to selectively record the gage measurements of each of the air flow probe transducers.

Another modification of the computer controlled multiple air flow probe transducer gage assembly includes an air flow control valve assembly which is adapted to selectively vary the rate of air flow to each of the probe transducer gage assemblies to selectively provide a full high air flow actuation calibration mode, an air flow soft contact gage measuring mode and a continuos low air flow cleaning rest mode therethrough.

Another embodiment of the invention comprises a cable actuated transducer gage assembly which is adapted to selectively make gage measurements with respect to a part positioned proximate thereto. This embodiment includes a probe transducer gage assembly which is provided with a selectively extendible piston probe slidably mounted therein so as to extend outwardly there from into measuring contact with a part positioned proximate thereto. As in the other embodiments of the invention, electronic sensing means are provided in selective operative engagement with the slidable piston probe and the probe transducer gage assembly so as to convert selective linear mechanical movement of the piston probe relative to the probe transducer gage assembly into measurable electrical signal changes corresponding to the selective linear mechanical movement of said piston probe. An external actuating cable is provided which extends into the probe transducer gage assembly into fixed operative engagement with the slidable piston probe. The actuating cable is adapted to selectively move the piston probe into measuring contact with a part positioned proximate thereto.

Another embodiment of the invention is a computer controlled cable actuated probe transducer gage assembly adapted to selectively make gage measurements with respect to a part positioned proximate thereto. The probe transducer gage assembly has a selectively extendable piston probe slidably mounted therein so as to extend outwardly therefrom into measuring contact with a part positioned proximate thereto. Electronic sensing means are provided in selective operative engagement with the slidable piston probe and the probe transducer gage assembly so as to convert selective linear mechanical movement of the piston probe relative to the transducer gage assembly into measurable electrical signal changes corresponding to such selectively linear mechanical movement of the piston probe. A solenoid actuated cable assembly is provided which extends into the probe transducer assembly in operative fixed engagement with the selectively slidable piston probe. The solenoid actuated cable assembly adapted to selectively move the piston probe into measuring contact with a part positioned proximate thereto. A computer control center is provided in operative engagement with the electronic sensing means and the solenoid actuated cable assembly. The computer control center is adapted to selectively actuate the solenoid actuated cable assembly so as to selectively move the piston probe into soft measuring contact with a part proximate thereto. The computer control center is adapted to actuate the electronic sensing means so as to simultaneously record the gage measurements made by the piston probe.

Another embodiment of the probe transducer gage assembly is adapted to selectively make gage measurements with respect to a part positioned proximate thereto. It comprises a probe transducer gage housing which has a rear wall with a piston probe support shaft receiving bore therethrough. The transducer gage housing also has a front wall with a piston probe receiving bore therethrough. A piston probe support shaft is fixedly mounted through the piston probe support shaft receiving bore so as to partially extend axially into the transducer gage housing. A hollow piston probe is provided with a piston probe support shaft receiving bore through the rear end wall thereof. The hollow piston probe slidably supported on the piston probe shaft extending thereinto through said piston probe support shaft receiving bore provided in the piston probe. The hollow piston probe is adapted to make selectively extendable slidable support engagement through the piston probe receiving bore provided through the transducer gage front wall. Thus, the hollow piston probe is supported at the rear portion thereof on the piston probe support shaft and at the forward portion thereof through the piston probe receiving bore through said transducer gage front wall. Piston probe actuating means are provided through the transducer gage so as to selectively actuate the piston probe into its extended soft contact measurement position against a part positioned proximate thereto.

Another embodiment of the invention consists of a continuous air flow probe transducer gage assembly which is adapted for vertically oriented operative use to selectively make gage measurements with respect to a part positioned proximate thereabove. In this embodiment, an elongate transducer gage housing assembly is provided which is adapted for a vertical oriented operative use position. The transducer gage housing assembly is provided actuating air inlet means provided through the rear wall portion thereof. The transducer gage housing assembly is provided with air outlet means at the forward wall portion thereof. This transducer gage housing defines an axially aligned air piston support shaft bore through the rear wall portion thereof. The transducer gage housing further defines an axially aligned air piston probe receiving bore through the front wall portion thereof. An air piston probe support shaft is fixedly provided through the support shaft bore provided though the rear wall of the transducer gage housing so as to axially extend partially into the gage housing assembly. A vertically oriented slidable hollow air piston probe assembly is provided which has a piston probe support shaft receiving bore provided through the rear wall thereof. The air piston probe is positioned in slidable rear support engagement with the air piston probe support shaft bore so as to be movably supported on the support shaft within the gage housing assembly. The air piston probe extends into slidable forward engagement with the piston probe receiving bore through the front wall of the transducer gage housing. The slidable air piston probe assembly and the transducer gage housing assembly coact to define an air flow channel continuously extending longitudinally through the transducer gage assembly from the air inlet means to the air outlet means so as to selectively receive a continuous selective actuating air flow through said air flow channel. The vertically oriented air piston probe is adapted to extend vertically into a slidable soft contact with an adjacent part being measured thereabove when a selective continuous air flow is introduced through the air flow channel so as to vertically actuate the air piston probe into its soft contact measurement position. The air piston probe is adapted to make a gravity induced retraction to its rest position when the flow of actuating air is selectively reduced. Electronic sensing means is in selective operative use engagement with the slidable hollow air piston probe assembly and the transducer gage housing assembly so as to convert selective linear mechanical movement of the movable air piston probe within the transducer gage housing assembly into measurable electrical signal changes corresponding to such selective linear mechanical movement of the air piston probe relative to the transducer gage housing assembly.

Another embodiment of the invention is a probe transducer gage assembly which has been modified for use in association with a lockable fixture mounting assembly which is adapted for lockably mounting the probe transducer gage assembly. The lockable fixture mounting assembly includes a lipped sleeve adapted for insertion into a fixture mounted bushing. The sleeve is provided with an annular fixture engaging lip portion at one end thereof. The sleeve is provided with a selectively located internal probe transducer housing engaging threaded portion. A transducer gage assembly is provided with an external sleeve engaging threaded portion. The probe transducer external threaded portion is adapted to threadably engage the sleeve internal threaded portion when the probe transducer is threaded into its operative use position within the sleeve. A locking sleeve assembly is adapted to matingly engage the external surface of the transducer gage assembly extending rearwardly from the fixture upon which it is mounted. The locking sleeve assembly is adapted to abuttingly engage the fixture and the locking sleeve assembly provided with set screw lock means to lockably engage threaded set screw receiving holes provided in the transducer gage assembly positioned therethrough in its operative use position.

Another embodiment of the invention is a transducer gage assembly which is adapted for selective operative use engagement with a fixture mounted transducer gage assembly engaging means. A fixture engaging collar means is provided with an external threaded portion adapted for threaded engagement with a corresponding threaded bore located in a fixture. The collar means has an internal transducer gage engaging threaded portion. A transducer gage assembly is provided which has a collar engaging threaded portion at a selected forward portion thereof which is adapted to threadably engage the internal threaded portion of the fixture mounted collar so as to be selectively held in its operative use position proximate to a part being measured.

Another modification of the transducer gage assembly includes a selectively adjustable calibration stop screw which is provided through a corresponding threaded bore in the rear end of said transducer gage housing assembly. The calibration stop screw is adapted to adjustably engage the back of the hollow air piston probe assembly so as to selectively adjust the rearward travel limit of said hollow air piston probe within said transducer gage housing assembly. This feature uniquely enables the user to easily provide a bench calibration of the transducer so that the mechanical distances traveled by all of the movable air piston probes are the same. Thus the need for identical manufacturing tolerances in the transducer gage assemblies is eliminated.

Note that while the term "air" has been used in describing the operation and structure of this invention, such as with respect to "air piston probe" or "air flow", it will be recognized that many other fluids may be suitably used with the invention, including compressed gasses such as nitrogen, or liquids such as oil.

Various other modifications of the invention may be made without departing from the principle thereof. Each of the modifications is to be considered as included in the hereinafter appended claims, unless these claims, by their language, expressly provide otherwise.

I claim:

1. In a continuous air flow probe transducer gage assembly adapted to selectively make gage measurements with respect to a part positioned proximate thereto comprising:

An elongate transducer gage housing assembly, said transducer gage housing assembly having actuating air inlet means provided through the rear wall portion thereof, said transducer gage housing assembly defining air outlet means at the forward wall portion thereof, said transducer gage housing defining an axially aligned piston probe support shaft bore through the rear wall portion thereof, said transducing gage housing defining an axially aligned air piston probe receiving bore through the front wall portion thereof;

an air piston probe support shaft fixedly provided through said support shaft bore so as to axially extend partially through said gage housing assembly, said air piston probe support shaft provided with at least one bias spring engaging means at the forward end thereof;

a slidable hollow air piston probe assembly having a piston probe support shaft receiving bore provided through the rear wall thereof, said hollow air piston probe in slidable rear support engagement with said air piston support shaft extending through said support shaft bore within said gage housing assembly, said hollow air piston probe in slidable forward support engagement with said piston probe receiving bore through the front wall portion of said transducer gage housing, said slidable hollow air piston probe assembly internally provided with bias spring engaging wall means at the rear portion thereof, said slidable air piston probe assembly and said transducer gage housing assembly coacting to define an air flow channel continuously extending longitudinally through said transducer gage assembly from said air inlet means to said air outlet means so as to selectively receive a continuous selective actuating air flow through said transducer gage assembly;

electronic sensing means in selective operative use engagement with said slidable hollow air piston probe assembly and said transducer gage housing assembly so as to convert selective linear mechanical movement of said movable air piston probe within said transducer gage housing assembly into measurable electrical signal changes corresponding to such selective linear mechanical movement of said air piston probe within said transducer gage housing assembly; and bias spring means concentrically provided along said air piston probe support shaft in operative engagement with said air piston probe assembly and said air piston probe assembly support shaft so as to maintain said air piston probe in its retracted rest position, said bias spring means adapted to controllably permit said air piston probe to extend into a slidable soft contact with an adjacent part being measured when a selective continuous air flow is introduced through said air flow channel so as to actuate said air piston probe assembly into its extended soft contact measurement position against a part positioned proximate thereto.

2. In the continuous air flow probe transducer gage assembly of claim 1 wherein said electronic sensing means comprise a linear potentiometer assembly fixedly positioned within said transducer gage housing assembly in a parallel spaced apart relationship to said slidable hollow air piston probe assembly, said air piston probe assembly provided with a spring biased electrical wiper element in operative contact use engagement with said potentiometer so as to convert selective linear mechanical movement of said movable air piston probe within said transducer gage assembly into measurable electrical signals corresponding to such selective linear mechanical operative use contact movement of said air piston probe wiper along said potentiometer.

3. The air flow probe transducer gage assembly of claim 1 wherein a cap member is fixedly attached at the inside base thereof to the front end of said slidable air piston probe assembly extending externally of said transducer gage housing, said cap extending rearwardly over the forward portion of said transducer gage housing in a spaced apart relationship thereto so as to define a continuation exit of said air flow channel.

4. The air flow probe transducer gage assembly of claim 1 wherein a second bias spring engaging wall means is provided on the rear portion of said air probe support shaft, said second bias spring engaging wall means adapted for selective operative use engagement with the rear end of said bias spring means.

5. The air flow probe transducer gage assembly of claim 1 wherein a transverse probe housing is provided for threaded fixed engagement with the forward end of said transducer gage housing, a ramp extension member fixedly provided on said slidable air piston probe so as to selectively extend into said transverse probe housing, said transverse probe housing provided with a spring biased transverse probe contact element adapted for operative use transverse extension through a transverse probe opening provided in the wall of said transverse probe housing, said transverse probe contact element having a ramp engagement sloped surface portion at the base thereof adapted for operative use engagement with said corresponding ramp extension member.

6. In the probe transducer gage assembly of claim 1 wherein a selectively adjustable calibration stop screw is provided through a corresponding threaded bore in the rear end of said transducer gage housing assembly, said calibration stop screw adapted to adjustably engage the back of said hollow air piston probe assembly so as to selectively adjust the rearward travel limit of said hollow air piston probe within said transducer gage housing assembly.

7. In a probe transducer assembly adapted to selectively make gage measurements with respect to a part positioned proximate thereto comprising:

a transducer gage housing having a rear end wall portion and a front end wall portion, said transducer gage housing defining a support shaft receiving bore in said rear end wall portion thereof, said front end wall portion defining a bearing bore therethrough;

a support shaft fixed within said support shaft receiving bore, said support shaft extending longitudinally partially through said transducer gage housing, said support shaft being provided with spring engaging portion proximate to a rear portion thereof;

a slidable hollow piston probe having a front end wall portion and slidably mounted on said support shaft so as to be selectively slidably extendable longitudinally through said bearing bore in said transducer gage housing to an extended position in measuring contact with a part positioned proximate thereto; and a bias spring making selective operative contact at a first end thereof with an inside surface of said front end wall portion of said piston probe, said bias spring making selective operative contact at a second end thereof with the spring engaging portion of said support shaft so as to urge said piston probe toward said extended position.

8. The probe transducer assembly defined in claim 7 further including a second spring engaging portion formed on said support shaft and a rear end wall portion formed on said piston probe wherein said bias spring may be placed in a second orientation to engage said second spring engaging portion of said support shaft with said second end of said bias spring and engage said rear end wall portion of said piston probe with said first end of said piston probe to urge said piston bore toward a retracted position out of contact with a part positioned proximate thereto.

9. The probe transducer assembly defined in claim 8 further including a piston probe actuator for urging said piston probe toward said extended position when said bias spring is positioned in said second orientation.

10. In the probe transducer gage assembly of claim 7 wherein a selectively adjustable calibration stop screw is provided through a corresponding threaded bore in the rear end of said transducer gage housing assembly, said calibration stop screw adapted to adjustably engage the back of said piston probe so as to selectively adjust the rearward travel limit of said piston probe within said transducer gage housing assembly.

11. In a computer controlled fluid flow probe transducer gage assembly adapted to selectively make gage measurements with respect to a part positioned on a fixture proximate thereto comprising a fluid flow probe transducer gage housing selectively mounted on a part fixture, said fixture adapted to retain a part in gage measuring distance proximate to said probe transducer gage housing, said probe transducer gage housing being provided with a slidable fluid actuated piston probe;

a fluid supply assembly provided in operative engagement with said fluid flow probe transducer gage housing, said fluid supply assembly in operative use engagement with a fluid flow control valve assembly adapted to selectively vary the rate of a continuous supply of fluid flow to said fluid flow probe transducer gage assembly so as to selectively actuate said piston probe from a retracted position to a soft contact measuring position against a part being measured; and a computer control center in operative engagement with said fluid flow probe transducer gage housing and with said fluid flow control valve assembly said computer control center adapted to control the actuation of said fluid actuated piston probe into soft measuring contact against the part being measured, said computer control center being adapted to selectively record a gage measurement of said fluid flow probe transducer.

12. In the computer controlled fluid flow probe transducer gage assembly of claim 11 wherein said fluid flow control valve assembly is adapted to selectively vary the rate of fluid flow therethrough to said fluid flow probe transducer gage housing to selectively provide a high fluid flow actuation calibration mode, a soft contact gage measuring mode and a continuous low fluid flow cleaning rest mode of operation of said fluid flow probe transducer gage assembly.

13. In a cable actuated transducer gage assembly adapted to selectively make gage measurements with respect to a part positioned proximate thereto comprising:

a transducer gage housing, said transducer gage housing having a selectively extendable piston probe slidably mounted therein so as to extend outwardly therefrom into measuring contact with a part positioned proximate thereto;

a sensor in selective operative engagement with said slidable piston probe and said transducer gage housing so as to convert selective linear mechanical movement of said piston probe relative to said transducer gage housing into measurable electrical signal changes corresponding to such selectively liners mechanical movement of said piston probe; and an external actuating cable extending into said transducer gage housing into fixed operative engagement with said slidable piston probe, said actuating cable adapted to selectively move said piston probe into measuring contact with a part positioned proximate thereto and to positively retract said probe to a retracted position out of contact with the part.

14. The cable actuated transducer gage assembly defined in claim 13, wherein said probe transducer gage housing defines a fluid inlet opening for admitting a flow of a fluid.

15. In the probe transducer gage assembly of claim 13 wherein a selectively adjustable calibration stop screw is provided through a corresponding threaded bore in the rear end of said transducer gage housing assembly, said calibration stop screw adapted to adjustably engage the back of said piston probe so as to selectively adjust the rearward travel limit of said piston probe within said transducer gage housing assembly.

16. In a computer controlled cable actuated probe transducer gage assembly adapted to selectively make gage measurements with respect to a part positioned proximate thereto compressing:

a probe transducer gage assembly, said probe transducer gage assembly having a selectively extendable probe slidably mounted therein so as to extend outwardly therefrom into measuring contact with a part positioned proximate thereto;

a sensor in selective operative engagement with said slidable probe and probe transducer gage assembly so as to convert selective linear mechanical movement of said probe relative to said transducer gage assembly into measurable electrical signal changes corresponding to such selectively linear mechanical movement of said probe;

a solenoid actuated cable assembly extending into said probe transducer assembly in operative fixed engagement with said selectively slidable probe, said solenoid actuated cable assembly adapted to selectively move said probe into measuring contact with a part positioned proximate thereto and to positively move said probe to a retracted position out of contact with the part; and a computer control center in operative engagement with said sensor and said solenoid actuated cable assembly, said computer control center adapted to control the selective actuation of said solenoid actuated cable assembly so as to selectively move said probe into soft measuring contact with a part proximate thereto, said computer control center adapted to actuate said electronic sensing means so as to simultaneously record a gage measurement made by said probe.

17. In a probe transducer assembly adapted to selectively make gage measurements with respect to a part positioned proximate thereto comprising:

a transducer gage housing, said transducer gage housing having a rear wall with a support shaft receiving bore therethrough, said transducer gage housing having a from wall with a beating bore therethrough;

a support shaft fixedly mounted through said support shaft receiving bore so as to partially extend axially into said transducer gage housing;

a hollow piston probe having a bore through a rear end wall thereof, said hollow piston probe slidably supported on said support shaft extending thereinto through said bore provided therein, said hollow piston probe adapted to make selectively extendable slidable support engagement through said bearing bore provided through said transducer gage housing front wall so that said hollow piston probe is supported at a rear portion thereof on said support shaft and at a forward portion thereof by said transducer gage housing front wall about said beating bore; and a piston probe actuator provided to selectively actuate hollow piston probe into its extended soft contact measurement position against a part positioned proximate thereto.

18. In the probe transducer gage assembly of claim 17 wherein a selectively adjustable calibration stop screw is provided through a corresponding threaded bore in the rear end of said transducer gage housing assembly, said calibration stop screw adapted to adjustably engage the back of said piston probe so as to selectively adjust the rearward travel limit of said piston probe within said transducer gage housing assembly.

19. In a continuous fluid flow probe transducer gage assembly adapted for vertically oriented operative use to selectively make gage measurements with respect to a part positioned proximate mate thereabove comprising:

a transducer gage housing adapted for a vertical oriented operative use position, said transducer gage housing having an actuating fluid inlet provided through a rear wall portion thereof, said transducer gage housing defining a fluid outlet through a forward wall portion thereof, said transducer gage housing defining a support shaft receiving bore through the rear wall portion thereof, said transducer gage housing defining a bearing bore through the forward wall portion thereof which is axially aligned with said support shaft receiving bore;

a support shaft fixedly provided through said support shaft receiving bore so as to axially extend partially into said transducer gage housing;.

a vertically oriented slidable hollow piston probe having a piston bore through a rear wall thereof, said piston bore receiving said support shaft therein such that said piston probe in slidable rear support engagement with said support shaft so as to be movably supported on said support shaft within said transducer gage housing, said piston probe in slidable forward engagement with said bearing bore through the front wall of said transducer gage housing, said slidable piston probe and said transducer gage housing coacting to define a fluid flow channel continuously extending longitudinally through said transducer gage housing from said fluid inlet to said fluid outlet so as to receive a continuous fluid flow through said fluid flow channel, said vertically oriented piston probe adapted to extend vertically into a slidable soft contact with an adjacent part being measured thereabove when said continuous fluid flow is selectively increased to an actating fluid flow rate introduced through said fluid flow channel so as to vertically actuate said piston probe into its soft contact measurement position, said piston probe adapted to make a gravity induced retraction to its rest position when the flow of actuating fluid is selectively reduced; and a sensor in selective operative use engagement with said slidable hollow piston probe assembly and said transducer gage housing so as to convert selective linear mechanical movement of said movable piston probe within said transducer gage housing into measurable electrical signal changes corresponding to such selective linear mechanical movement of said piston probe relative to said transducer gage housing.

20. In the probe transducer gage assembly of claim 19 wherein a selectively adjustable calibration stop screw is provided through a corresponding threaded bore in the rear end of said transducer gage housing assembly, said calibration stop screw adapted to adjustably engage the back of said piston probe so as to selectively adjust the rearward travel limit of said piston probe within said transducer gage housing assembly.

21. In a probe transducer gage assembly modified for use in a lockable fixture mounting assembly comprising:

a lipped sleeve adapted for insertion into a bore through a fixture, said sleeve having an annular fixture engaging lip portion at one end thereof, said sleeve having a threaded portion;

a transducer gage assembly having a threaded portion adapted to threadably engage the threaded portion of said sleeve when said transducer gage assembly is threaded into its operative use position within said bore; and a locking sleeve assembly which is adapted to matingly engage a portion of said transducer gage assembly extending rearwardly from the fixture upon which said transducer gage assembly is mounted, said locking sleeve assembly adapted to abuttingly engage the fixture, said locking sleeve assembly releasably engaging the transducer gage assembly in its operative use position and cooperating with said lipped sleeve to secure said transducer gage assembly in said bore.

22. In a transducer gage assembly adapted for selective operative use engagement with a fixture mounted transducer gage assembly engaging means comprising:

a fixture engaging collar having an external threaded portion adapted for threaded engagement with a corresponding threaded bore located in a fixture, said collar having an internal transducer gage engaging threaded portion; and a transducer gage assembly having a collar engaging threaded portion at a selected forward portion thereof, said transducer gage assembly adapted to threadably engage said collar so as to be selectively held in its operative use position proximate to a part being measured.

23. A transducer gage assembly adapted to selectively make gage measurements with respect to a part positioned proximate thereto and adapted to be connected to a supply of pressurized fluid, said transducer gage assembly comprising:

a housing having a fluid inlet adapted to be connected to a supply of pressurized fluid and a fluid outlet defined therein and a bore defined in said housing in fluid communication with said fluid inlet and said fluid outlet;

a piston slidably disposed in said bore, said housing and said piston cooperating to define a fluid flow channel extending through said housing providing fluid communication between said fluid inlet and said fluid outlet, said piston being selectively movable relative to said housing between a retracted position and a measuring position; and an electronic sensor operatively engaging said piston to convert mechanical movement of said piston into a corresponding electrical signal.

24. The transducer gage assembly defined in claim 23 wherein said housing has a piston support shaft fixed thereto, said piston support shaft slidably supporting said piston in said bore.

25. The probe transducer gage assembly defined in claim 23 further including a spring operating between said piston and said housing to urge said piston toward one of said retracted position and said measuring position.

26. The transducer gage assembly defined in claim 25 wherein, when said fluid inlet is connected to a source of pressurized fluid to establish a fluid flow having a first rate of fluid flow from said fluid inlet to said fluid outlet, said spring acts to retain said piston in said one of said retracted position and said measuring position and said transducer gage assembly operates in a rest mode.

27. The transducer gage assembly defined in claim 26 wherein said spring urges said piston toward said retracted position and, when said fluid flow is selectively continuously increased above said first rate of fluid flow, said piston moves toward said measuring position against a progressively greater spring force exerted by said spring on said piston until said piston is moved into soft contact with a part to operate said transducer gage assembly in a measurement mode.

28. The transducer gage assembly defined in claim 26 further including cooperating stop surfaces formed on said piston and said housing, said stop surfaces contacting one another when said piston is in a fully extended position, wherein when said fluid flow is selectively increased above said first rate of fluid flow to cause said piston to moves from said retracted position to said fully extended position, thereby operating said transducer gage assembly in a calibration mode.

29. In a computer controlled fluid flow probe transducer gage assembly adapted to selectively make gage measurements with respect to a part positioned on a fixture proximate thereto comprising:

a fluid flow probe transducer gage housing selectively mounted on a part fixture, said fixture adapted to retain a part in gage measuring distance proximate to said probe transducer gage housing, said probe transducer gage housing being provided with a slidable fluid actuated piston probe;

a fluid supply assembly provided in operative engagement with said fluid flow probe transducer gage housing, said fluid supply assembly in operative use engagement with a fluid flow control valve assembly adapted to selectively vary the rate of a continuous supply of fluid flow to said fluid flow probe transducer gage assembly so as to selectively actuate said piston probe from a retracted position to a soft contact measuring position against a part being measured; and a computer control center in operative engagement with said fluid flow probe transducer gage housing and with said fluid flow control valve assembly said computer control center adapted to control the actuation of said fluid actuated piston probe into soft measuring contact against the part being measured, said computer control center being adapted to selectively record a gage measurement of said fluid flow probe transducer.

\* \* \* \* \*

UNITED STATES PATENT AND TRADEMARK OFFICE
CERTIFICATE OF CORRECTION

PATENT NO. : 5,473,822
DATED : December 12, 1995
INVENTOR(S) : James E. Struble

It is certified that error appears in the above-indentified patent and that said Letters Patent is hereby corrected as shown below:

Column 19, Claim  7, Line 12,  after "with", insert -- a --.

Column 20, Claim 16, Line  4,  after "thereto", change "compressing" to -- comprising --.

Column 21, Claim 17, Line  7,  before "wall", change "from" to -- front --.

Column 21, Claim 17, Line  7,  before "bore", change "beating" to --bearing --.

Column 21, Claim 17, Line 21,  after "said", change "beating" to -- bearing --.

Column 21, Claim 17, Line 23,  before "hollow", insert -- said --.

Signed and Sealed this

Thirtieth Day of July, 1996

Attest:

BRUCE LEHMAN

*Attesting Officer*  *Commissioner of Patents and Trademarks*